(12) United States Patent
Gagne et al.

(10) Patent No.: US 11,982,764 B2
(45) Date of Patent: *May 14, 2024

(54) LIGHT DETECTION AND RANGING USING PRISM WEDGE PAIR

(71) Applicant: AEVA, INC., Mountain View, CA (US)

(72) Inventors: Keith Gagne, Santa Clara, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 17/405,639

(22) Filed: Aug. 18, 2021

(65) Prior Publication Data

US 2022/0146633 A1    May 12, 2022

Related U.S. Application Data

(63) Continuation of application No. 17/221,686, filed on Apr. 2, 2021, now Pat. No. 11,099,260, which is a continuation of application No. 17/093,599, filed on Nov. 9, 2020, now Pat. No. 10,976,415.

(51) Int. Cl.
| | | |
|---|---|---|
| *G01S 7/481* | (2006.01) | |
| *G01S 17/89* | (2020.01) | |
| *G02B 5/04* | (2006.01) | |
| *G02B 26/10* | (2006.01) | |
| *G02B 27/30* | (2006.01) | |

(52) U.S. Cl.
CPC .......... *G01S 7/4815* (2013.01); *G01S 7/4817* (2013.01); *G01S 17/89* (2013.01); *G02B 26/108* (2013.01); *G02B 5/045* (2013.01); *G02B 27/30* (2013.01)

(58) Field of Classification Search
None
See application file for complete search history.

(56) References Cited

U.S. PATENT DOCUMENTS

| | | |
|---|---|---|
| 4,076,414 A | 2/1978 | Tulbert |
| 4,121,883 A | 10/1978 | Goshima et al. |
| 5,006,721 A | 4/1991 | Cameron et al. |
| 5,200,606 A | 4/1993 | Krasutsky et al. |
| 6,310,989 B1 | 10/2001 | Liu |
| 6,438,278 B1 | 8/2002 | Liu et al. |
| 7,898,712 B2 | 3/2011 | Adams et al. |
| 10,564,263 B2 | 2/2020 | Efimov et al. |
| 10,775,485 B2 | 9/2020 | Shim et al. |
| 2006/0050270 A1 | 3/2006 | Elman |
| 2006/0274418 A1 | 12/2006 | Hirai |
| 2009/0079824 A1 | 3/2009 | Winsor |
| 2009/0296170 A1 | 12/2009 | Sumi |
| 2013/0258469 A1 | 10/2013 | Park et al. |
| 2015/0024968 A1 | 1/2015 | Rulison et al. |
| 2015/0055078 A1 | 2/2015 | Johnstone et al. |

(Continued)

*Primary Examiner* — Hina F Ayub
(74) *Attorney, Agent, or Firm* — Womble Bond Dickinson (US) LLP

(57) ABSTRACT

A light detection and ranging (LIDAR) system includes a first optical source to generate a first optical beam, a first collimating lens to collimate the first optical beam, a first prism wedge of a first prism wedge pair to redirect the first optical beam, and a first focusing lens to focus the first optical beam on a front surface of a second prism wedge of the first prism wedge pair, the second prism wedge to direct the first optical beam toward an output lens.

20 Claims, 7 Drawing Sheets

(56) References Cited

U.S. PATENT DOCUMENTS

| | | |
|---|---|---|
| 2015/0345906 A1* | 12/2015 | Varshneya .............. F41G 3/165 |
| | | 235/404 |
| 2016/0161752 A1 | 6/2016 | Negoita et al. |
| 2017/0131404 A1 | 5/2017 | Ohtomo et al. |
| 2017/0227721 A1 | 8/2017 | Yu et al. |
| 2018/0062345 A1 | 3/2018 | Bills et al. |
| 2018/0117851 A1 | 5/2018 | Reese et al. |
| 2018/0283947 A1 | 10/2018 | Bouchard et al. |
| 2019/0101645 A1 | 4/2019 | DeMersseman et al. |
| 2019/0317199 A1 | 10/2019 | Chong |
| 2020/0088845 A1 | 3/2020 | Taity et al. |
| 2020/0141554 A1 | 5/2020 | Chen |
| 2020/0200874 A1 | 6/2020 | Donovan |
| 2020/0284883 A1 | 9/2020 | Ferreira et al. |
| 2021/0263303 A1* | 8/2021 | Dong ................... G02B 26/101 |
| 2021/0318169 A1* | 10/2021 | Klapp ................... G01J 3/0205 |

* cited by examiner ly, as more optical beams are added to the system using a single output lens, the decenter of the beams on the output lens is increased, resulting in changes in numerical aperture (NA) of the system as well as an increase in aberration content of the output beams.

LIGHT DETECTION AND RANGING USING PRISM WEDGE PAIR

CROSS REFERENCE TO RELATED APPLICATION

This application is a continuation of U.S. patent application Ser. No. 17/221,686, filed Apr. 2, 2021, which is a continuation of U.S. patent application Ser. No. 17/093,599, filed Nov. 9, 2020, which issued on Apr. 13, 2021 as U.S. Pat. No. 10,976,415 the entire contents of which are hereby incorporated by reference.

FIELD OF INVENTION

The present disclosure is related to light detection and ranging (LIDAR) systems in general, and more particularly to image conjugate pitch reduction of a LIDAR system.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal (LO signal). Conventional LIDAR systems require high frame rates and an increased number of scanning points typically achieved by using multiple numbers of optical sources to emit optical beams. The optical sources may be placed in a one-dimensional or two-dimensional array separated by some distance, referred to as pitch. The array of optical sources may share a single output lens. The single output lens provides angular separation between collimated optical beams to create discrete lines after reaching the scanner of the LIDAR system. Using the single output lens for multiple optical beams may reduce the cost form factor of the system in comparison to adding additional output lenses. However, as more optical beams are added to the system using a single output lens, the decenter of the beams on the output lens is increased, resulting in changes in numerical aperture (NA) of the system as well as an increase in aberration content of the output beams.

SUMMARY

The present disclosure describes various examples of LIDAR systems and methods for optical source pitch reduction.

In some embodiments, a light detection and ranging (LIDAR) system includes a first optical source to generate a first optical beam, a first collimating lens to collimate the first optical beam, a first prism wedge of a first prism wedge pair to redirect the first optical beam, and a first focusing lens to focus the first optical beam on a front surface of a second prism wedge of the first prism wedge pair, the second prism wedge to direct the first optical beam toward an output lens.

In some embodiments, the LIDAR system includes a second optical source to generate a second optical beam, a second collimating lens to collimate the second optical beam, a third prism wedge of a second prism wedge pair to redirect the second optical beam, and a second focusing lens to focus the second optical beam on a front surface of a fourth prism wedge of the second prism wedge pair, the fourth prism wedge to direct the second optical beam toward the output lens.

In some embodiments, a spacing of the first and second optical beams at the output lens is determined by an angle of the first prism wedge pair and the second prism wedge pair and a first focal length of the first focusing lens and a second focal length of the second focusing lens. In some embodiments, the first collimating lens is spaced a first distance from the first optical source, the first distance corresponding to a focal length of the first collimating lens. In some embodiments, the second prism wedge is spaced a second distance from the first focusing lens, the second distance corresponding to a focal length of the first focusing lens. In some embodiments, the output lens creates an angular separation between the first optical beam and the second optical beam.

In some embodiments, the angular separation between the first optical beam and the second optical beam is less than two degrees. In some embodiments, the angular separation between the first and second optical beams is determined by a spacing between the first and second optical beams and a focal length of the output lens. In some embodiments, the first prism wedge pair is adjustable to calibrate a first decenter for the first optical beam with respect to the output lens. In some embodiments, the output lens transmits the first optical beam to scanner optics of the LIDAR system.

In some embodiments, a method includes generating a first optical beam at a first optical source, collimating the first optical beam using a first collimating lens, and redirecting the first optical beam using a first prism wedge of a first prism wedge pair. The method further includes focusing the first optical beam on a second prism wedge of the first prism wedge pair using a first focusing lens and redirecting the first optical beam toward an output lens using the second prism wedge.

In some embodiments, the method further includes generating a second optical beam at a second optical source, collimating the second optical beam using a second collimating lens, redirecting the second optical beam using a third prism wedge of a second prism wedge pair, focusing the second optical beam on a fourth prism wedge of the second prism wedge pair using a second focusing lens, and redirecting the second optical beam toward the output lens using the fourth prism wedge.

In some embodiments, a spacing of the first and second optical beams is determined by an angle of the first prism wedge pair and the second prism wedge pair and a first focal length of the first focusing lens and second focal length of the second focusing lens. In some embodiments, the first collimating lens is spaced a first distance from the first optical source, the first distance corresponding to a focal length of the first collimating lens. In some embodiments, the second prism wedge is spaced a second distance from the first focusing lens, the second distance corresponding to a focal length of the first focusing lens.

In some embodiments, the method further includes creating an angular separation of the first optical beam and second optical beam using the output lens. In some embodiments, the angular separation is based on a spacing between the first optical beam and the second optical beam at the output lens. In some embodiments, the angular separation between the first optical beam and the second optical beam is less than two degrees. In some embodiments, the method further includes adjusting the first prism wedge pair to calibrate a first decenter for the first optical beam with respect to the output lens. In some embodiments, the output lens transmits the first optical beam to scanner optics.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for image conjugate pitch reduction. According to some embodiments, the described LIDAR system may be implemented in any sensing market, such as, but not limited to, transportation, manufacturing, metrology, medical, and security systems. According to some embodiments, the described LIDAR system is implemented as part of a front-end of frequency modulated continuous-wave (FMCW) device that assists with spatial awareness for automated driver assist systems, or self-driving vehicles.

The present disclosure addresses the above issues associated with adding additional optical beams to a single output lens of a LIDAR system by reducing the pitch (i.e., spacing) between the optical beams prior to reaching the output lens. In one example, the present disclosure reduces the pitch using a dual prism architecture with a collimating lens and a focusing lens for each of the optical beams. The collimating lens may first collimate an optical beam into a first prism wedge. The prism may angle the optical beam towards the focusing lens (i.e., toward a center axis of the output lens) which may focus the optical beam on a front surface of a second prism wedge. The second prism wedge may redirect the optical beam toward the output lens at a reduced decenter resulting in reduced spacing between optical beams. The reduced spacing between optical beams may reduce aberrations in the output beams and may also provide for reduced angular separation between the output optical beams.

Figure 1:
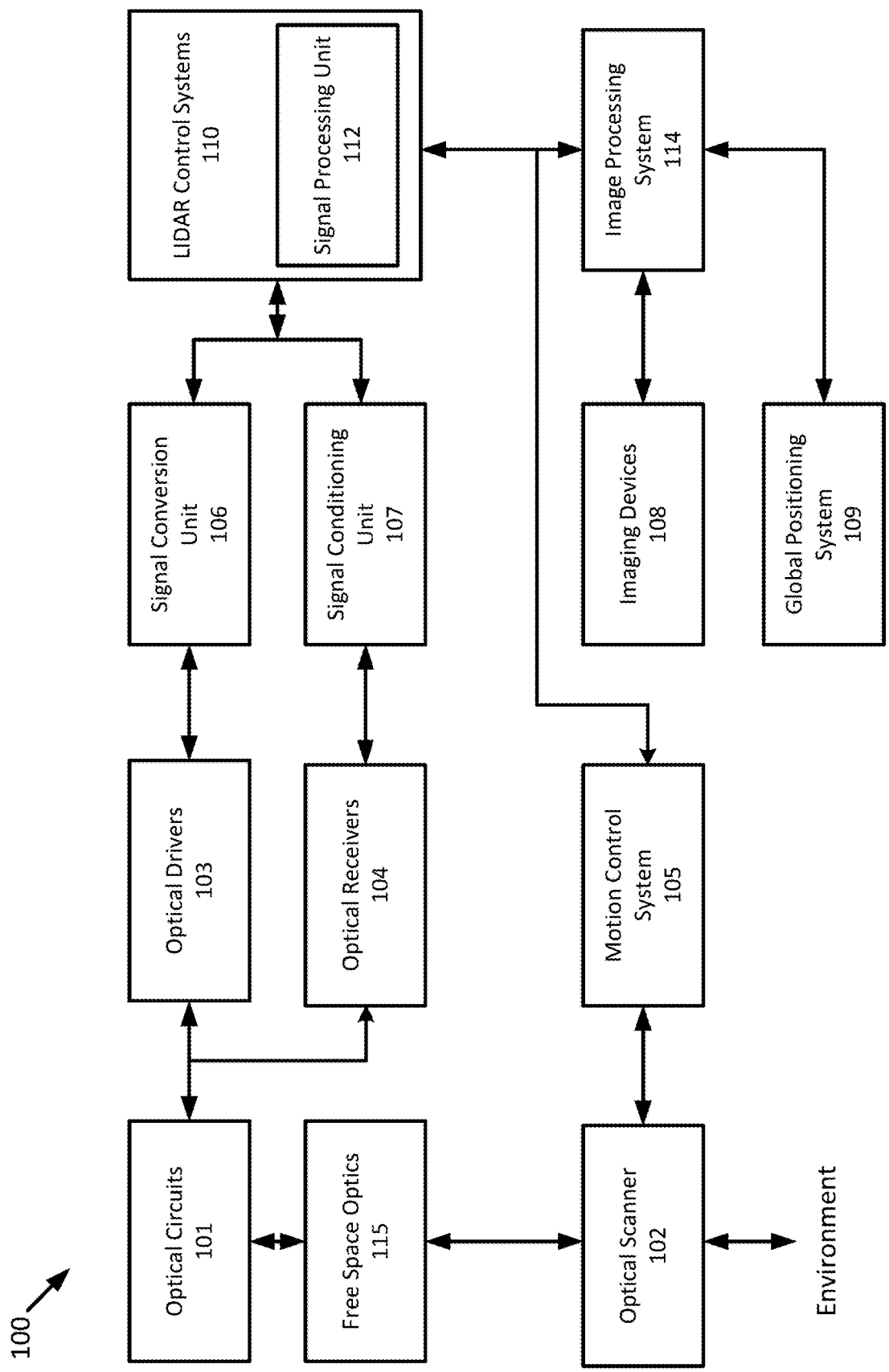
FIG. 1 illustrates an example FMCW LIDAR system according to embodiments of the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals for further processing. In some embodiments, the signal processing unit 112 also receives position data from the motion control system 105 and galvanometers (not shown) as well as image data from the image processing system 114. The signal processing unit 112 can then generate 3D point cloud data with information about range and velocity of points in the environment as the optical scanner 102 scans additional points. The signal processing unit 112 can also overlay 3D point cloud data with the image data to determine velocity and distance of objects in the surrounding area. The system also processes the satellite-based navigation location data to provide a precise global location.

Figure 2:
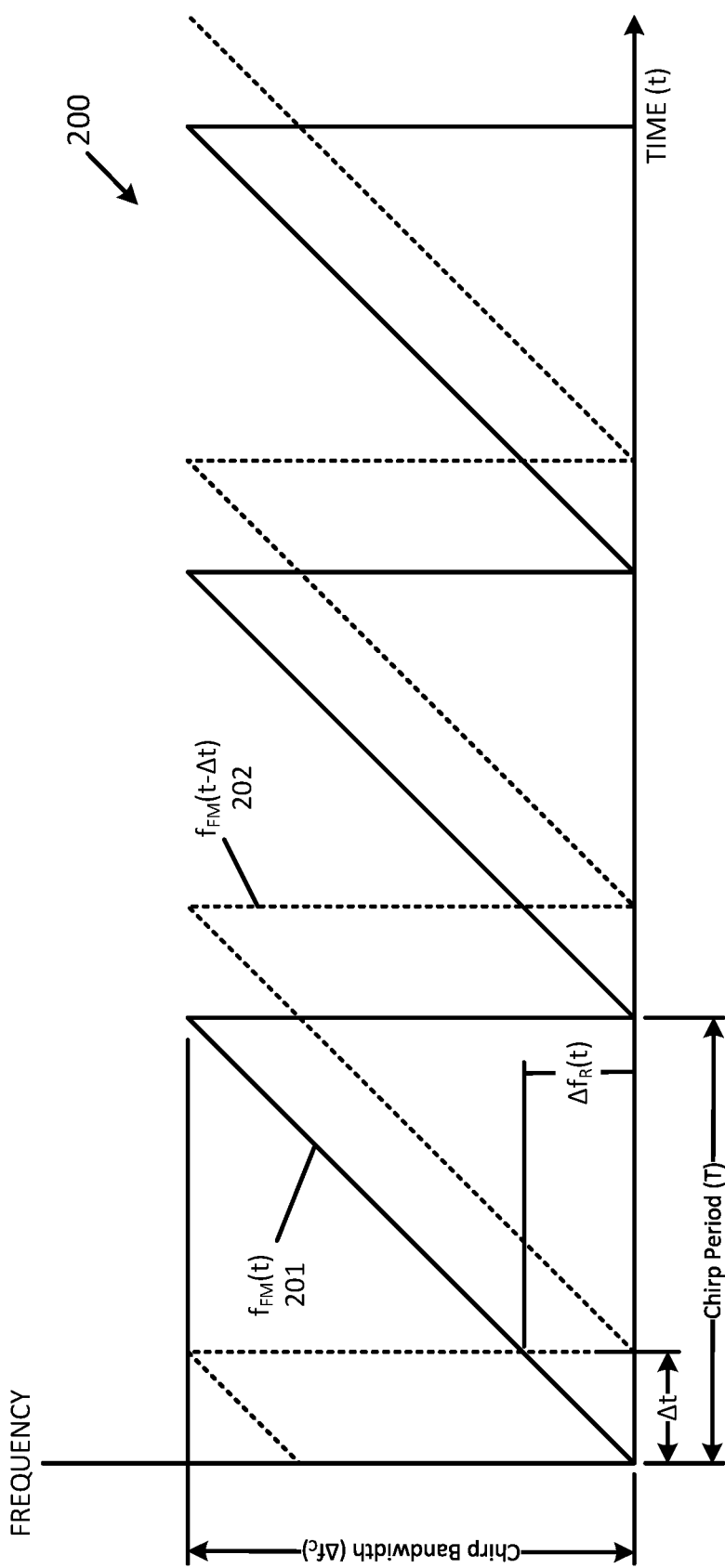
FIG. 2 is a time-frequency diagram illustrating an example of FMCW LIDAR waveforms according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth Mc and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
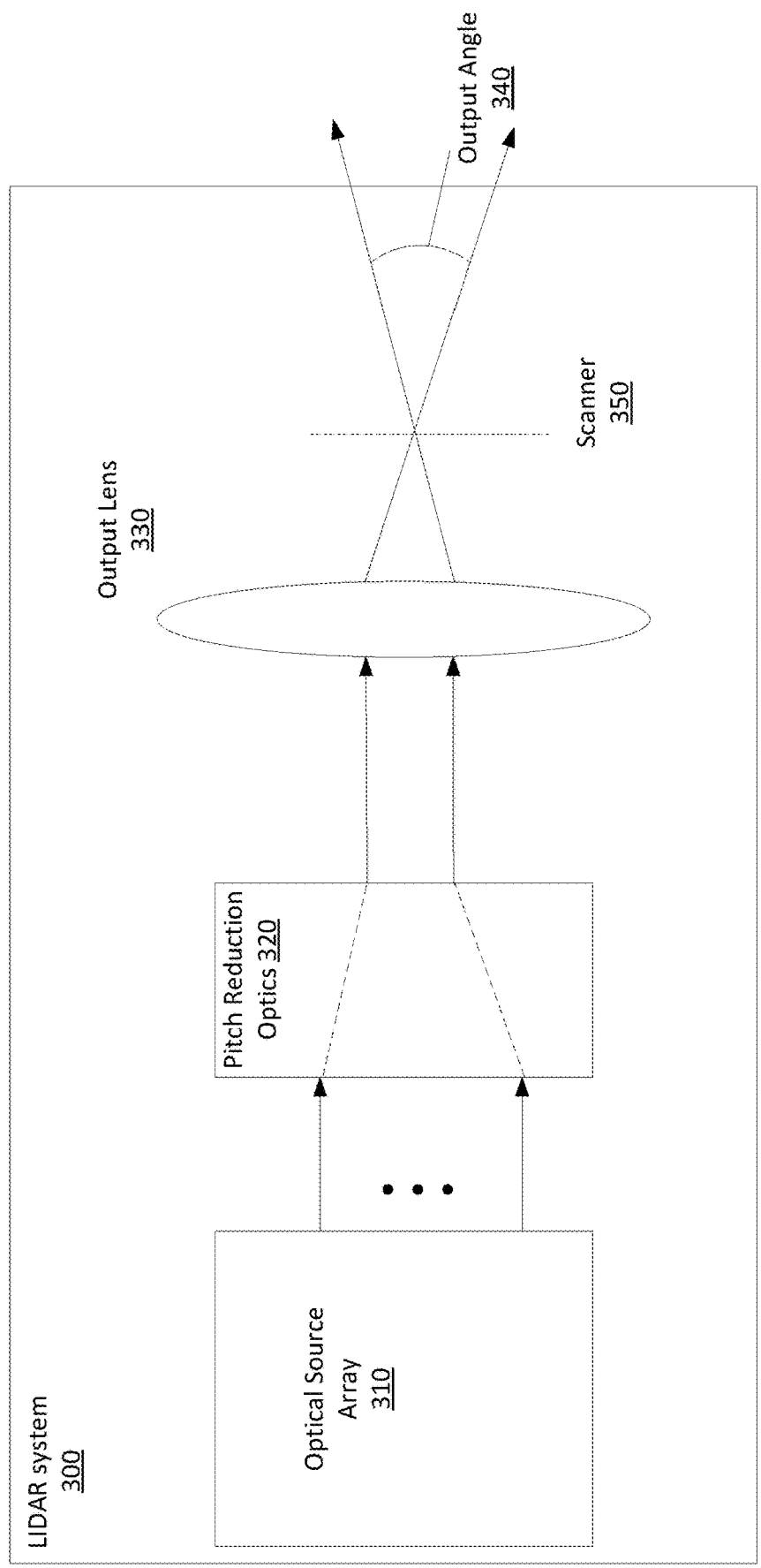
FIG. 3 is a block diagram of an example LIDAR system according to embodiments of the present disclosure.

FIG. 3 illustrates an example LIDAR system 300 to reduce a pitch (i.e., spacing) of optical beams provided to a single output collimating lens. Optical system 300 includes an optical source array 310, pitch reduction optics 320, and an output lens 330. The optical source array 310 may include several optical sources that are separated by a certain spacing, referred to as pitch. Reducing the pitch between optical sources is desirable in order to provide for more optical sources at the output lens 330, to reduce aberrations due to large decenter at the output lens 330 and to reduce an output angle 340 between the optical beams. In one embodiment, the pitch between the optical beams may be reduced using pitch reduction optics 320. Pitch reduction optics 320 may receive optical beams at a first pitch corresponding to the pitch of the optical sources and reduce the pitch between the optical beams prior to reaching the output lens 330. The reduced pitch may provide for smaller decenter of each of the optical beams at the output lens 330, resulting in a smaller output angle 340 between the optical beams without changing the focal length of the output lens 330. The pitch reduction optics 320 may include free space optics (e.g., free space optics 115 described in FIG. 1), silicon optics, or any other type of optics to redirect the optical beams in a manner that reduces the pitch between the optical beams. An example embodiment of pitch reduction optics 320 is described in more detail below with respect to FIG. 4. The LIDAR system 300 may also include scanner optics 350, such as one or more galvo mirrors to scan a field of view (FOV) of the LIDAR system 300.

The pitch of the optical beams received at the output lens 330 may determine the output angle 340 at which the optical beams will be transmitted from the LIDAR system 300. The output angle may also depend on the focal length of the output lens. For example, the output angle separation between beams may be calculated from equation (1) below:

$$\theta = \arctan\left(\frac{\frac{pitch}{n}}{FL}\right) \quad (1)$$

where θ is the output angle 340 between optical beams, pitch is the spacing between the optical beams, n is the number of optical beams, and FL is the focal length of the output lens 330. The reduced pitch between the optical beams may provide for an output angle of less than two degrees. In some embodiments, the reduced pitch may provide for an output angle of less than one degree.

Figure 4:
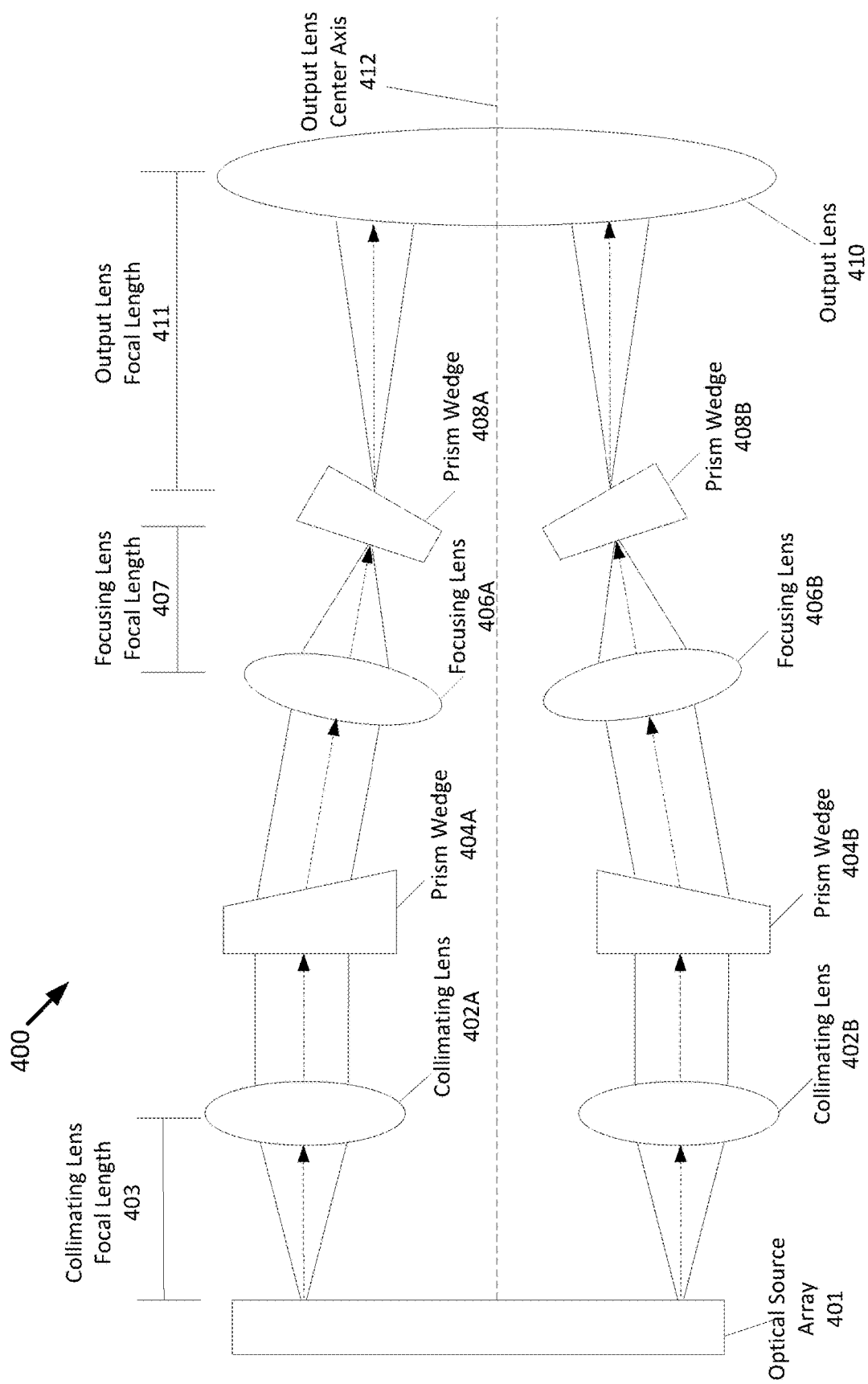
FIG. 4 is a block diagram of an example optical system according to embodiments of the present disclosure.

FIG. 4 illustrates an example optical system 400 to reduce a pitch of optical beams provided to a single output collimating lens. Optical system 400 includes an optical source array 401 to produce several optical beams. Although FIG. 4 depicts only two optical sources generating two corresponding optical beams, the optical source array 401 may include any number of optical sources in either a one-dimensional or two-dimensional array. In one embodiment, optical source array 401 may include three or more optical sources. LIDAR system 400 further includes optics to redirect one or more optical beams and to reduce the decenter of each optical beam on an output lens 410. The optics to redirect each optical beam may include a collimating lens 402A-B, a first prism wedge 404A-B, a focusing lens 406A-B, and a second prism wedge 408A-B.

In one embodiment, collimating lens 402A-B may receive an optical beam from the optical source array 401 and collimate the optical beam. The optical beam as collimated may be directed toward the first prism wedge 404A-B. The second prism wedge 408A-B may redirect the optical beam in the direction of the output lens center axis 412 (i.e., in a direction to reduce the decenter of the optical beam). The reduction in the decenter of each optical beam may be dependent on the angle of the first prism wedge 404A-B and the focal length of the focusing lens 406A-B. In one embodiment, the angle of the first prism wedges 404A-B can be adjusted to calibrate the decenter of the optical beam and the pitch between the optical beams. A focusing lens 406A-B may receive the redirected optical beam from the first prism wedge 404A-B and focus the optical beam at a front surface of a second prism wedge 408A-B. The second prism wedges 408A-B may redirect the optical beam toward the output lens 410. The second prism wedges 408A-B may redirect the optical beam to be parallel with the output lens center axis 412 and each of the other optical beams. Therefore, as can be seen from FIG. 4, each optical beam from the optical source array 401 may be redirected to have a reduced decenter on the output lens 410 than would be provided by the pitch of the optical sources of the optical source array 401.

In one embodiment, a local oscillator (LO) may be generated at the front surface of the second prism wedge 408A-B. For example, the front surface of the second prism wedge 408A-B may be partially reflective (e.g., a partially reflective coating, surface, etc.). Therefore, a portion of the optical beam may be reflected by the second prism wedge 408A-B as an LO of the optical beam.

Figure 5A:
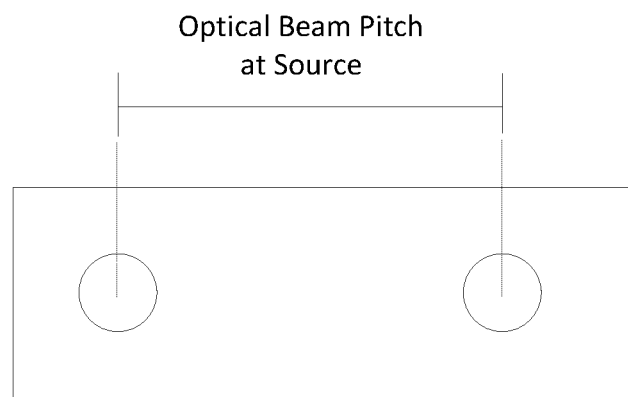
FIG. 5A is an illustration of optical beam spacing at an optical source array according to embodiments of the present disclosure.

FIG. 5A depicts a cross-sectional view of an exemplary optical beam pitch at the optical source array 401 in accordance with FIG. 4. The optical beam pitch (i.e., spacing) at the optical source array 401 may be limited by the structure of the optical sources and manufacturing constraints of the optical beam array.

Figure 5B:
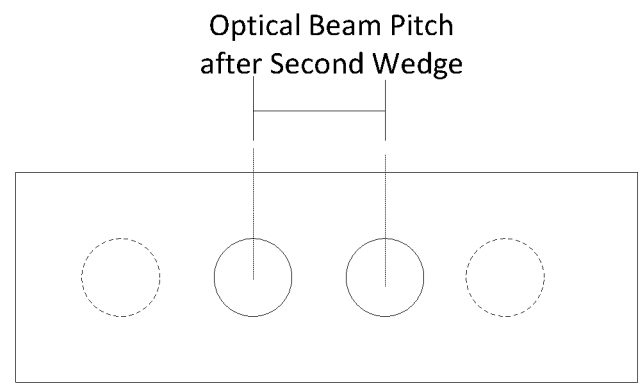
FIG. 5B is an illustration of optical beam spacing at an image conjugate position according to embodiments of the present disclosure.

FIG. 5B depicts a cross-sectional view of an exemplary optical beam pitch at the source conjugate position after pitch reduction. The source conjugate position as depicted may be directly after the second wedge 408A-B, as depicted in FIG. 4. The dashed circles depicted in FIG. 5A may illustrate the pitch at which the optical beams would be at without the optical system (e.g., optical system 400) to reduce the optical beam pitch. Therefore, as shown, the optical beam pitch at the source conjugate position may be reduced as compared to the optical beam pitch at the optical source array (e.g., optical source array 401).

Figure 5C:
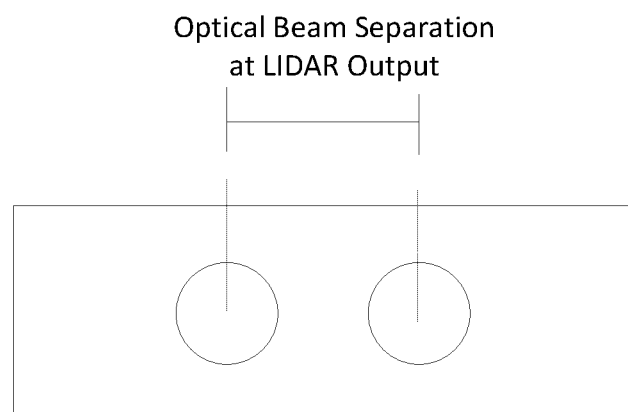
FIG. 5C is an illustration of an output optical beam separation according to embodiments of the present disclosure.

FIG. 5C illustrates an example of the optical beam at an output of LIDAR systems described herein according to some embodiments. The optical beam separation at the LIDAR output may be directly dependent on the pitch between the optical beams at the source conjugate position, and accordingly the decenter of each beam incident on the output lens (e.g., output lens 410 of FIG. 4).

Figure 6:
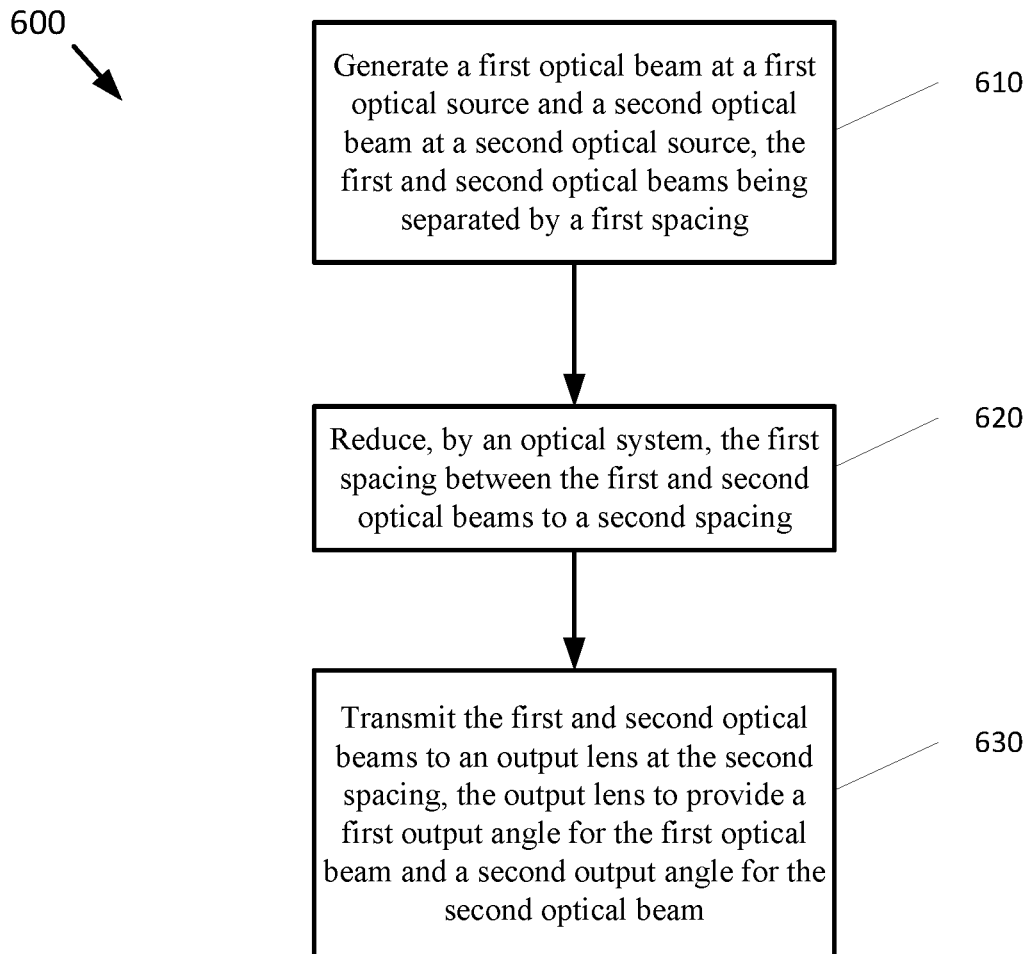
FIG. 6 is a flow diagram of an example method for reducing image conjugate pitch according to embodiments of the present disclosure.

FIG. 6 is a flowchart illustrating an example method 600 in a LIDAR system for image conjugate pitch reduction.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where a first optical source generates a first optical beam and a second optical source generates a second optical beam. The first and second optical beams may be separated by a first spacing. The first spacing may correspond to the spacing of the first and second optical sources. A chief ray of each of the first and second optical beams may be substantially parallel to one another.

At block 620, an optical system reduces the first spacing between the first and second optical beams to a second spacing. The optical system may include several sets of optics to redirect each optical beam. For example, the optical system may include a first set of optics to reduce a decenter of a first optical beam and a second set of optics to reduce a decenter of the second optical beam. Each set of optics may include at least a prism wedge pair to change the direction of the optical beams. The sets of optics may also include a collimating lens to first collimate the optical beams toward a first prism wedge of a prism wedge pair. The first prism wedge may direct the optical beam to a focusing lens. The focusing lens may focus the optical beam at a front surface of a second prism wedge. The second prism wedge may be complimentary to the first prism wedge to redirect the optical beam toward the output lens on a trajectory parallel to the original optical beam generated by the optical source.

At block 630, the optical system transmits the first and second optical beams to an output lens. The output lens may provide an angular separation between the first and second optical beams. The angular separation may depend on the spacing between the first and second optical beams. The angular separation may provide for distinct lines to scan a scene in the FOV of the LIDAR system to avoid overlap of collected data points.

Figure 7:
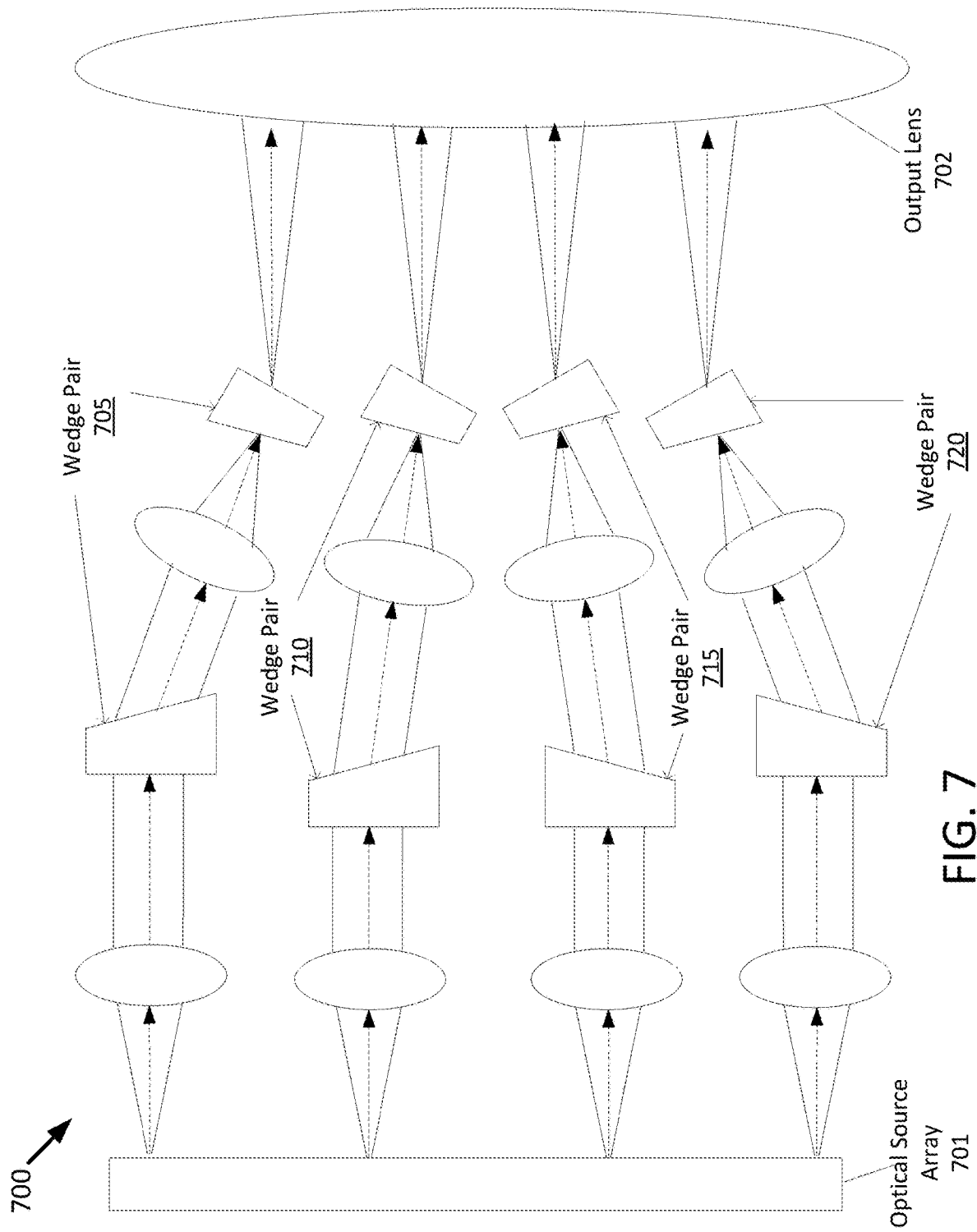
FIG. 7 is a block diagram of another example optical system to reduce image conjugate pitch according to embodiments of the present disclosure.

FIG. 7 illustrates another example embodiment of an optical system 700 to reduce a pitch of optical beams provided to a single output collimating lens 702. Optical system 700 includes an optical source array 701 including four optical sources and associated sets of optics to reduce the pitch of the optical beams generated by the optical sources. In one embodiment, each set of optics includes a wedge pair to reduce the decenter of each optical beam and the separation between the four optical beams. The inner wedge pairs 710 and 715 may have wedge angles to reduce the pitch of the inner optical beams by a particular distance. The outer wedge pairs 705 and 720 may have larger wedge angles to reduce the pitch of the outer optical beams by a larger distance than the inner wedges. The larger wedge angles of the outer wedge pairs 705 and 720 may provide for similar spacing between each of the optical beams at the output lens. It should be noted that optical system 700 may be extended to any number of optical sources as well as any combination of optics to reduce the pitch of the optical sources in focal space. As additional optical sources are added in parallel, the wedge angles of the optics for the additional sources may be increased accordingly as they are further from center.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system comprising:
    a first optical source to generate a first optical beam;
    a first collimating lens to collimate the first optical beam;
    a first prism wedge of a first prism wedge pair to redirect the first optical beam; and
    a first focusing lens to focus the first optical beam on a front surface of a second prism wedge of the first prism wedge pair, the second prism wedge to direct the first optical beam toward an output lens.

2. The LIDAR system of claim 1, further comprising:
    a third prism wedge of a second prism wedge pair to redirect a second optical beam; and
    a second focusing lens to focus the second optical beam on a front surface of a fourth prism wedge of the second prism wedge pair, the fourth prism wedge to direct the second optical beam toward the output lens.

3. The LIDAR system of claim 2, wherein a spacing of the first and second optical beams at the output lens is determined by an angle of the first prism wedge pair and the second prism wedge pair and a first focal length of the first focusing lens and a second focal length of the second focusing lens.

4. The LIDAR system of claim 2, wherein the output lens creates an angular separation between the first optical beam and the second optical beam.

5. The LIDAR system of claim 4, wherein the angular separation between the first optical beam and the second optical beam is less than two degrees.

6. The LIDAR system of claim 4, wherein the angular separation between the first and second optical beams is determined by a spacing between the first and second optical beams and a focal length of the output lens.

7. The LIDAR system of claim 1, wherein the first collimating lens is spaced a first distance from the first optical source, the first distance corresponding to a focal length of the first collimating lens.

8. The LIDAR system of claim 7, wherein the second prism wedge is spaced a second distance from the first focusing lens, the second distance corresponding to a focal length of the first focusing lens.

9. The LIDAR system of claim 1, wherein the first prism wedge pair is adjustable to calibrate a first decenter for the first optical beam with respect to the output lens.

10. The LIDAR system of claim 1, wherein the output lens transmits the first optical beam to scanner optics of the LIDAR system.

11. A method, comprising:
    generating a first optical beam at a first optical source;
    collimating the first optical beam using a first collimating lens;
    redirecting the first optical beam using a first prism wedge of a first prism wedge pair;
    focusing the first optical beam on a second prism wedge of the first prism wedge pair using a first focusing lens; and
    redirecting the first optical beam toward an output lens using the second prism wedge.

12. The method of claim 11, further comprising:
    redirecting a second optical beam using a third prism wedge of a second prism wedge pair;
    focusing the second optical beam on a fourth prism wedge of the second prism wedge pair using a second focusing lens; and
    redirecting the second optical beam toward the output lens using the fourth prism wedge.

13. The method of claim 12, wherein a spacing of the first and second optical beams is determined by an angle of the first prism wedge pair and the second prism wedge pair and a first focal length of the first focusing lens and second focal length of the second focusing lens.

14. The method of claim 11, wherein the first collimating lens is spaced a first distance from the first optical source, the first distance corresponding to a focal length of the first collimating lens.

15. The method of claim 14, wherein the second prism wedge is spaced a second distance from the first focusing lens, the second distance corresponding to a focal length of the first focusing lens.

16. The method of claim 11, further comprising:
    creating an angular separation of the first optical beam and second optical beam using the output lens.

17. The method of claim 16, wherein the angular separation is based on a spacing between the first optical beam and the second optical beam at the output lens.

18. The method of claim 16, wherein the angular separation between the first optical beam and the second optical beam is less than two degrees.

19. The method of claim 11, further comprising:
    adjusting the first prism wedge pair to calibrate a first decenter for the first optical beam with respect to the output lens.

20. The method of claim 11, wherein the output lens transmits the first optical beam to scanner optics.

* * * * *